Patented Sept. 18, 1945

2,385,282

UNITED STATES PATENT OFFICE 2,385,282

2-NITRO-3-METHOXY-PHENOL AND PROCESS OF MAKING SAME

Charles B. Jaeger, Jr., Baltimore, Md., assignor to Lynch and Company, St. Louis, Mo., a corporation of Missouri No Drawing. Application September 23, 1942, Serial No. 459,431

2 Claims. (Cl. 260—613)

This invention relates to the provision of 2-nitro-3-methoxy phenol.

I have found that 2-nitro-3-methoxy-phenol may be prepared in good yield by reacting 2-nitro-resorcinol with dimethyl sulphate in the approximate molal ratio of 1 to 1¾ at a temperature not materially in excess of 40° C. and preferably below the latter figure. Care is necessary in the semi-methylation of 2-nitro resorcinol (to give the monomethyl ether), since increasing the molal ratio of dimethyl sulphate to 2-nitro resorcinol, or maintaining the temperature of the reaction above 40° C., favors formation of the dimethyl ether and decreases the yield of the desired monomethyl ether. The reaction preferably is conducted in an alkaline liquid medium and with vigorous stirring.

The 2-nitro-3-methoxy-phenol may be separated from the reaction products by filtering (to remove any dimethyl ether by-product simultaneously formed), acidifying the filtrate, extracting with ether and separating the ether extract, evaporating the solvent ether, and fractionating the residue to remove any unreacted 2-nitro resorcinol from the 2-nitro-3-methoxy-phenol product.

I have found, also, that the simultaneously formed dimethyl ether may be demethylated, by a procedure more specifically described hereinafter, to yield a further amount of 2-nitro-3-methoxy phenol.

The product, 2-nitro-3-methoxy-phenol, is a generally light orange crystalline material which, in pure form, has a melting point of 53–54° C. (corr.). Its diacetoxymercuri derivative is a bactericide and antiseptic.

The invention will now be described in greater detail in the following:

To 900 cc. of fuming sulphuric acid (sp. gr. 1.875), on a water bath, was added slowly 250 gms. of powdered resorcinol. The mixture was heated at about 100° C. for a half hour and then cooled to 25° C., at which temperature it was maintained while a solution of 150 gms. of fuming nitric acid (sp. gr. 1.5) in 450 gms. of sulphuric acid (sp. gr. 1.84) was slowly added. After the mixture had stood for about one-half hour, 1550 cc. of water was added, and the solution was steam distilled yielding 137 gms. M. P. 87–88°, 39% of the theoretical yield of 2-nitro resorcinol.

36 grams of 2-nitro resorcinol and 38 cc. of dimethyl sulphate were placed in a flask and stirred vigorously while 300 cc. of 10% sodium hydroxide was being added, keeping the temperature below 40° C. Stirring was continued for fifteen minutes after the addition of sodium hydroxide was complete, the mixture was then cooled, and the dimethyl ether was filtered; 16.3 gms. The filtrate was acidified and extracted with ether. The ether was evaporated and the residue fractionated giving 3.6 gms. of 2-nitro resorcinol, and 19.4 gms. of 2-nitro-3-methoxy-phenol. B. P. 118–125/1 mm. M. P. 50–52°. Yield of 50%. Recrystallized twice from petroleum ether, the 2-nitro-3-methoxy-phenol melted at 53–54° C. (corr.).

By demethylation of the dimethyl ether a further amount of 2-nitro-3-methoxy-phenol was obtained. A mixture of 20 gms. of the dimethyl ether, 8.75 gms. of anhydrous aluminum chloride and 200 cc. of dry benzene was refluxed for 2 hours. The mixture was then hydrolyzed with hydrochloric acid, warming on a water bath to complete the reaction. The benzene layer was separated, and the water layer was extracted with ether. The combined ether and benzene solutions were washed with sodium hydroxide and evaporated, giving 3.9 gms. of unreacted dimethyl ether. The alkaline washings were acidified and extracted with ether, and the ether solution was dried with anhydrous sodium sulphate and distilled. The first fraction up to 99°/1 mm. contained 1.1 gms. of 2-nitro resorcinol. The last fraction, 10.1 gms., consisted essentially of 2-nitro-3-methoxy-phenol. B. P. 99–106°/1 mm. M. P. 49–53°, yield 54.5%.

I claim:

1. 2-nitro-3-methoxy-phenol, said compound being in pure state a light orange crystalline solid melting at 53–54° C. (corr.).

2. Process which comprises reacting one mole of 2-nitro resorcinol with approximately 1¾ moles of dimethyl sulphate, in dilute caustic alkali while maintaining the temperature below 40° C., cooling and filtering the reaction product, acidifying the filtrate, extracting the acidified filtrate with ether, evaporating the ether solvent, and recovering 2-nitro-3-methoxy-phenol from the residue by separating unreacted 2-nitro resorcinol from the 2-nitro-3-methoxy phenol of said residue by fractional distillation.

CHARLES B. JAEGER, JR.